United States Patent
Yang et al.

(10) Patent No.: US 9,323,089 B1
(45) Date of Patent: Apr. 26, 2016

(54) THIN LCD DEVICE

(71) Applicant: LITEMAX ELECTRONICS, INC., New Taipei (TW)

(72) Inventors: Tien-Teng Yang, New Taipei (TW); Ling-Chi Lo, New Taipei (TW)

(73) Assignee: LITEMAX ELECTRONICS INC. (TW)

( * ) Notice: Subject to any disclaimer, the term of this patent is extended or adjusted under 35 U.S.C. 154(b) by 25 days.

(21) Appl. No.: 14/562,800

(22) Filed: Dec. 8, 2014

(51) Int. Cl.
*G02F 1/1333* (2006.01)
*H02B 1/015* (2006.01)

(52) U.S. Cl.
CPC ............ *G02F 1/133308* (2013.01); *G02F 2001/133314* (2013.01); *G02F 2001/133322* (2013.01)

(58) Field of Classification Search
CPC ............ G02F 1/133308; G02F 1/133608; G02F 1/134452; G02F 2001/133317; G02F 1/133615; H02B 1/056; H02B 1/40; H02B 1/04; H02B 1/06
USPC ............................................. 349/58; 361/644
See application file for complete search history.

(56) References Cited

U.S. PATENT DOCUMENTS

| 5,404,271 | A | * | 4/1995 | Satou | G06F 1/1616 361/679.32 |
| 2011/0110046 | A1 | * | 5/2011 | Itoh | G02F 1/133308 361/709 |
| 2011/0273631 | A1 | * | 11/2011 | Hayashi | G02B 6/0091 348/790 |

* cited by examiner

*Primary Examiner* — Mike Qi
(74) *Attorney, Agent, or Firm* — Schmeiser, Olsen & Watts, LLP

(57) ABSTRACT

A thin LCD device includes an LCD panel with fixing holes; a fixed plate with two opposite sides covering two opposite sides of the LCD panel and having through holes corresponsive to the fixing holes of the LCD panel respectively; a main board fixed to the fixed plate and the fixed plate being installed between the main board and the LCD panel; a housing shielding the main board and covering sides of the LCD panel and the fixed plate and having through holes corresponsive to the through holes of the fixed plate and the fixing holes of the LCD panel; and a fixing element passing through the respective through hole of the housing, the respective through hole of the fixed plate and the respective fixing hole of the LCD panel to fix the housing, the fixed plate and the LCD panel, so as to facilitate assembling and reduce thickness.

8 Claims, 6 Drawing Sheets

THIN LCD DEVICE

FIELD OF TECHNOLOGY

The present invention relates a liquid crystal display (LCD) device, in particular to a thin LCD device that simplifies its fixing structure to reduce thickness.

BACKGROUND

In a conventional LCD device, an LCD panel is mounted onto a frame first and then fixed to a fixed plate, and a main board is fixed to the fixed plate, and finally the fixed plate with the LCD panel and the main board is combined with a casing to produce the LCD device. However, the thickness of the conventional LCD device cannot be reduced in the aforementioned configuration.

The LCD panel, the fixed plate, the main board and the casing of the conventional LCD device are installed and fixed sequentially, so that a large quantity of fixing elements is required for assembling. Obviously, it is inconvenient to manufacturers.

Therefore, it is a main subject of the present invention to develop a thin LCD device with the features of easy assembling and thin thickness.

SUMMARY

It is a primary objective of the present invention to overcome the drawbacks of the prior art by providing a thin LCD device with the features of easy assembling and thin thickness.

To achieve the aforementioned and other objectives, the present invention provides a thin LCD device, comprising: an LCD panel, having a plurality of fixing holes formed on two opposite sides of the LCD panel respectively; a fixed plate, with two opposite sides covering the two opposite sides of the LCD panel respectively, and the two opposite sides of the fixed plate having a plurality of through holes formed thereon, and each through hole being configured to be corresponsive to each respective fixing hole of the LCD panel; a main board, fixed to the fixed plate, and the fixed plate being partitioned between the main board and the LCD panel; a housing, shielding the main board, and covering each side of the LCD panel and the fixed plate, and the housing having a plurality of through holes formed on two opposite sides of the housing respectively, and each through hole being configured to be corresponsive to each respective through hole of the fixed plate and each respective fixing hole of the LCD panel; and a plurality of fixing elements, passing through the through holes of the housing, the through holes of the fixed plate, and the fixing holes of the LCD panel respectively to fix the housing, the fixed plate and the LCD panel.

In the aforementioned thin LCD device, the fixed plate is disposed close to the LCD panel.

In the aforementioned thin LCD device, the housing is disposed close to the main board.

The aforementioned thin LCD device further comprises two side fixing strips installed between the housing and the fixed plate, and the side fixing strips include a plurality of through holes, and each through hole is configured to be corresponsive to the through holes of the fixed plate and the fixing holes of the LCD panel respectively, wherein the fixing elements are passed through the through holes of the housing, the through holes of the fixing strips, the through holes of the fixed plate, and the fixing holes of the LCD panel respectively to fix the housing, the side fixing strips, the fixed plate and the LCD panel.

In summation, the thin LCD device of the present invention provides an easy way of assembling of the LCD panel, the fixed plate and the housing and reduces the total thickness of the LCD device by the aforementioned arrangement and configuration.

BRIEF DESCRIPTION

DETAILED DESCRIPTION

The objects, characteristics and effects of the present invention will become apparent with the detailed description of the preferred embodiments and the illustration of related drawings as follows.

Figure 1:
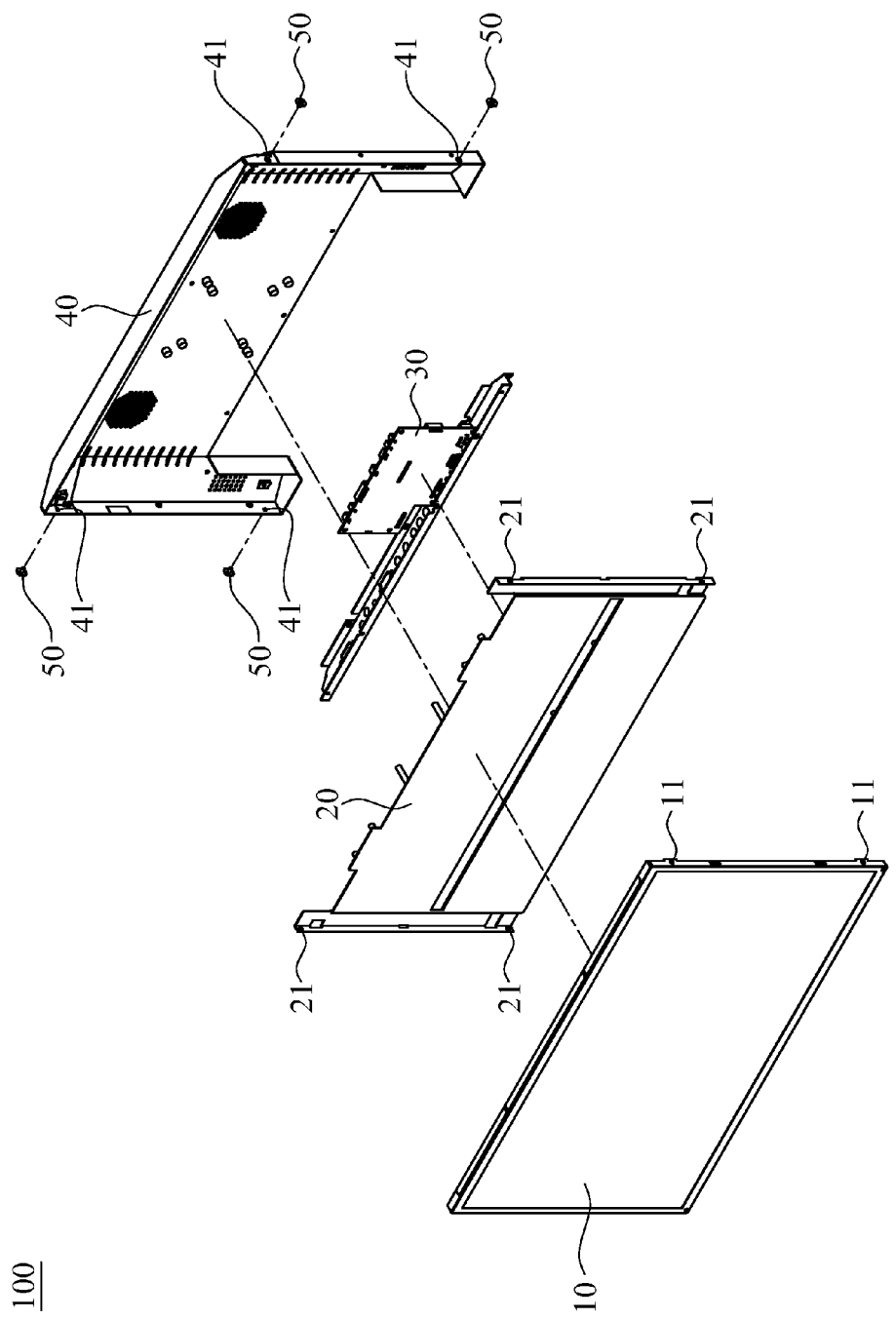
FIG. 1 is an exploded view of a thin LCD device of the present invention.
Figure 2:
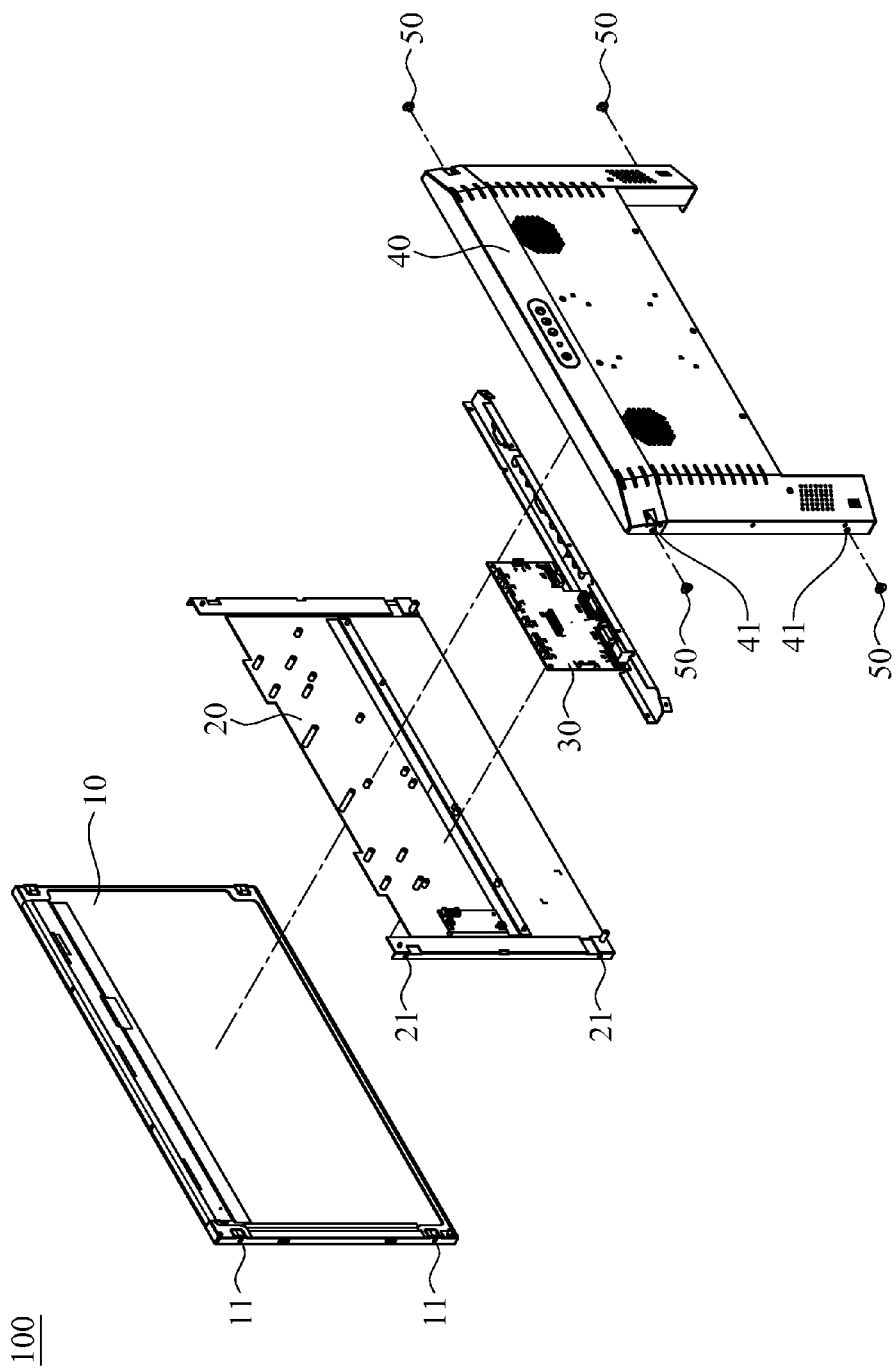
FIG. 2 is another exploded view of a thin LCD device of the present invention.
Figure 3:
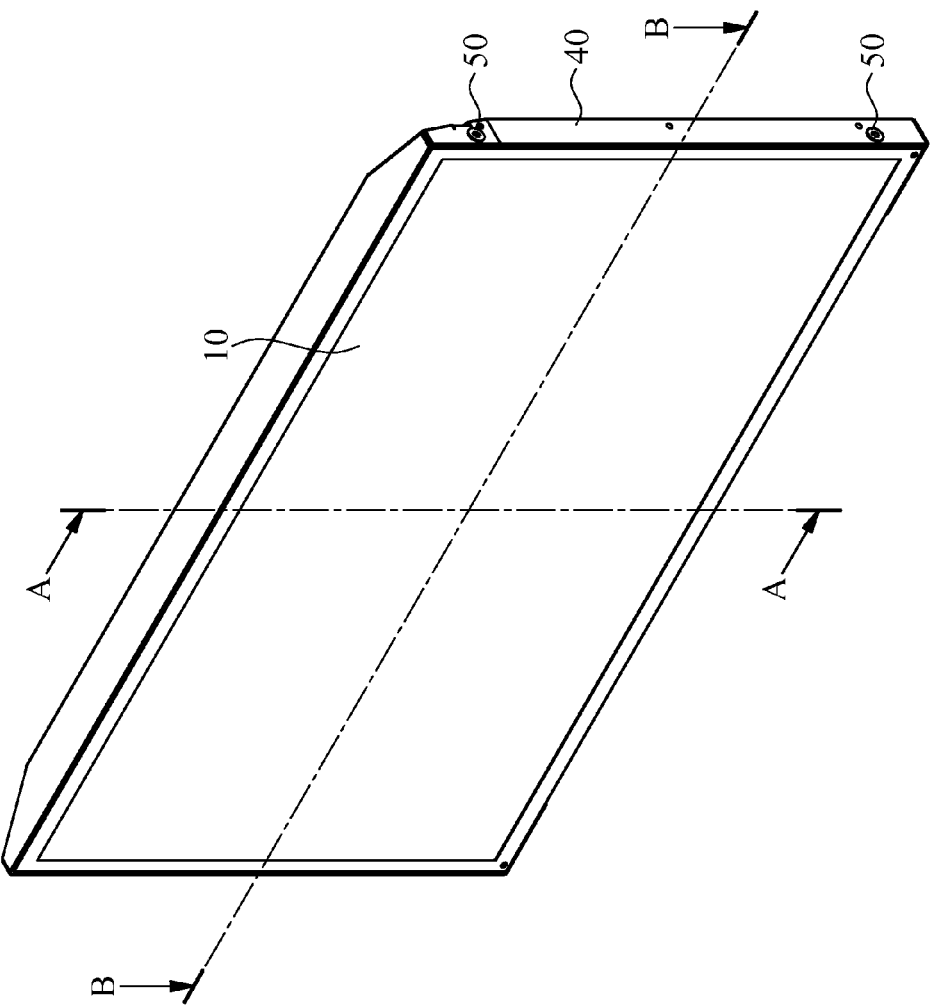
FIG. 3 is a perspective view of a thin LCD device of the present invention.

With reference to FIGS. 1 to 3 for the exploded views and perspective view of a thin LCD device 100 of the present invention respectively, the thin LCD device 100 comprises an LCD panel 10, a fixed plate 20, a main board 30, a housing 40 and a plurality of fixing elements 50.

The LCD panel 10 includes a plurality of fixing holes 11 formed on two opposite sides of the LCD panel 10 respectively. For example, if the LCD panel 10 is in a rectangular shape, the fixing holes 11 are uniformly and respectively formed at two opposite short sides of the LCD panel 10.

The fixed plate 20 is disposed close to the LCD panel 10, and two opposite sides of the fixed plate 20 cover the two opposite sides of the LCD panel 10, and the two opposite sides of the fixed plate 20 have a plurality of through holes 21, and each through hole 21 is configured to be corresponsive to each respective fixing hole 11 of the LCD panel 10.

The main board 30 is fixed to the fixed plate 20, and the fixed plate 20 is installed between the main board 30 and the LCD panel 10. For example, the LCD panel 10, the fixed plate 20 and the main board 30 are arranged sequentially as shown in FIG. 1.

The housing 40 shields the main board 30 and covers each side of the LCD panel 10 and the fixed plate 20, and the two opposite sides of the housing 40 have a plurality of through holes 41, and each through hole 41 is configured corresponsive to each respective through hole 21 of the fixed plate 20 and each respective fixing hole 11 of the LCD panel 10. Preferably, the housing 40 has a shape corresponsive to the shape of the fixed plate 20 and the main board 30.

The fixing elements 50 are passed through the through holes 41 of the housing 40, the through holes 21 of the fixed plate 20 and the fixing holes 11 of the LCD panel 10 respectively to fix the housing 40, the fixed plate 20 and the LCD panel 10. Preferably, the fixing elements 50 are screws.

Figure 4:
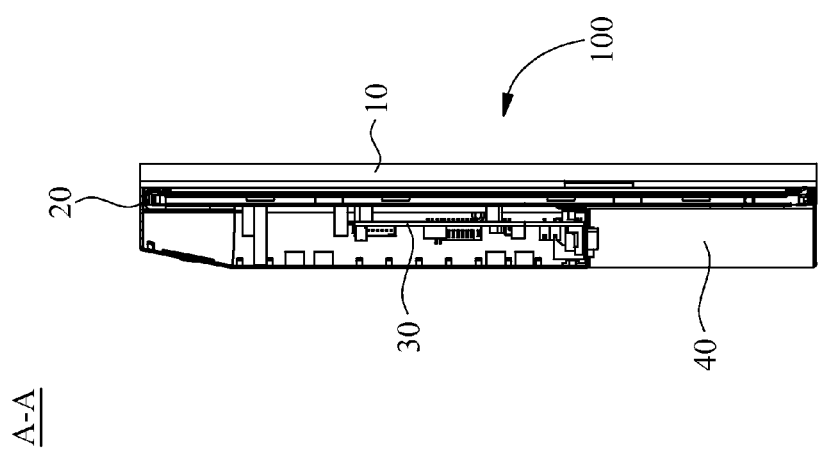
FIG. 4 is a cross-sectional view of Section A-A of FIG. 3.

With reference to FIG. 4 for the cross-sectional view of Section A-A of FIG. 3, the fixed plate 20 is disposed close to the LCD panel 10, and the main board 30 is fixed to the fixed plate 20, and the casing shields the main board 30, and such configuration maximizes the utility of spaces and reduces the thickness of the thin LCD device 100.

Figure 5:
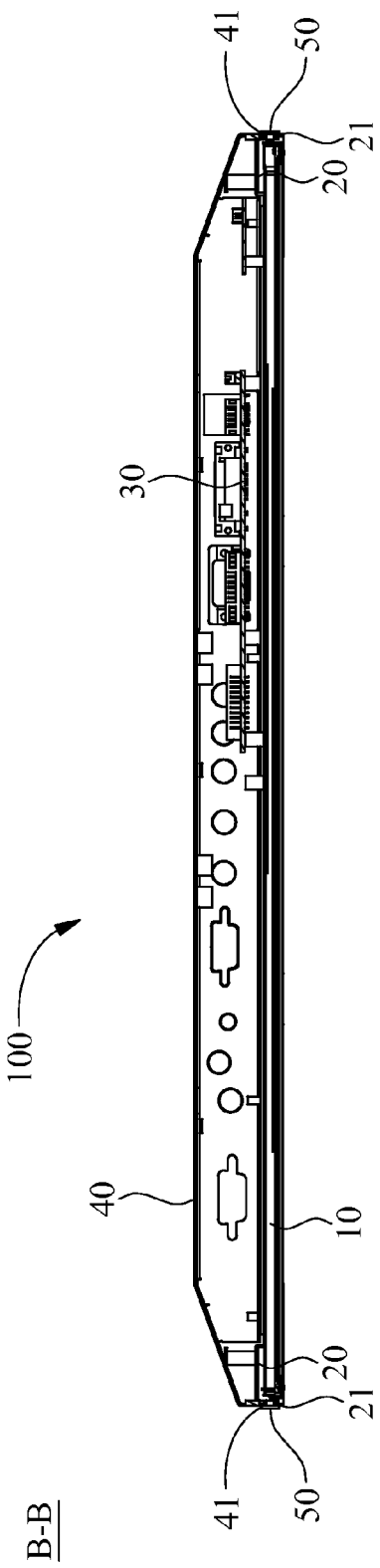
FIG. 5 is a cross-sectional view of Section B-B of FIG. 3.

With reference to FIG. 5 for the cross-sectional view of Section B-B of FIG. 3, each fixing element 50 is passed through each respective through hole 41 of the housing 40, each respective through hole 21 of the fixed plate 20 and each respective fixing hole 11 of the LCD panel 10 sequentially to fix the housing 40, the fixed plate 20 and the LCD panel 10. Unlike the conventional LCD device, the installation positions of the LCD panel 10, the fixed plate 20 and the housing 40 of the thin LCD device 100 of the present invention are arranged linearly to reduce the quantity of fixing elements 50 used, so as to simplify the assembling of the LCD panel, the fixed plate and the housing.

Even it is not shown in the figure, the housing 40 is preferably disposed close to the main board 30 in order to reduce the thickness of the thin LCD device 100.

In summation of the description above, the thin LCD device of the present invention provides an easy way of assembling the LCD panel, the fixed plate and the housing and reduces the total thickness by the aforementioned arrangement and configuration.

Figure 6:
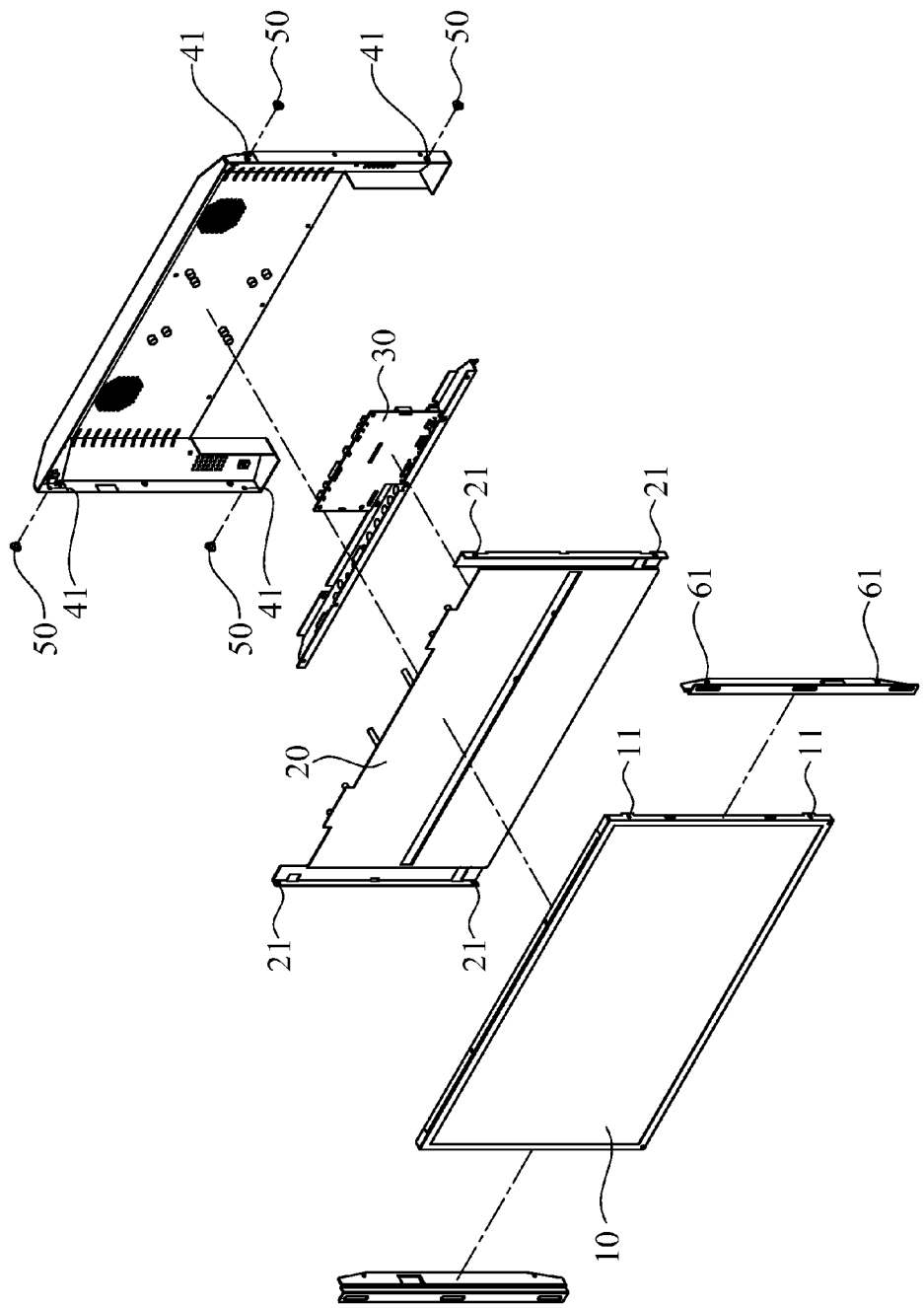
FIG. 6 is an exploded view of a thin LCD device further including two side fixing strips in accordance with the present invention.

In FIG. 6, the thin LCD device 100 further comprises two side fixing strips 60. The side fixing strips 60 are installed between the housing 40 and the fixed plate 20, and the side fixing strips 60 have a plurality of through holes 61, and each through hole 61 is configured to be corresponsive to each respective through hole 21 of the fixed plate 20 and each respective fixing hole 11 of the LCD panel 10, wherein the fixing elements 50 are passed through the through holes 41 of the housing 40, the through holes 61 of the side fixing strips 60, the through holes 21 of the fixed plate 20 and the fixing holes 11 of the LCD panel 10 sequentially and respectively to fix the housing 40, the side fixing strips 60, the fixed plate 20 and the LCD panel 10.

When it is necessary to fix a side of the thin LCD device onto a wall (not shown in the figure), the configuration of the side fixing strips allows the installation positions of the LCD panel, the fixed plate, each side fixing strip and the housing to be arranged linearly, so as to achieve the effects of reducing the quantity of fixing elements used, providing an easy assembling of the LCD panel, the fixed plate, the side fixing strips and the housing, and reducing the total thickness of the LCD device.

While the invention has been described by means of specific embodiments, numerous modifications and variations could be made thereto by those skilled in the art without departing from the scope and spirit of the invention set forth in the claims.

What is claimed is:

1. A thin LCD device, comprising:
    an LCD panel, having a plurality of fixing holes formed on two opposite sides of the LCD panel respectively;
    a fixed plate, with two opposite sides covering the two opposite sides of the LCD panel respectively, and the two opposite sides of the fixed plate having a plurality of through holes formed thereon, and each through hole being configured to be corresponsive to each respective fixing hole of the LCD panel;
    a main board, fixed to the fixed plate, and the fixed plate being installed between the main board and the LCD panel;
    a housing, shielding the main board, and covering each side of the LCD panel and the fixed plate, and the housing having a plurality of through holes formed on two opposite sides of the housing respectively, and each through hole being configured to be corresponsive to each respective through hole of the fixed plate and each respective fixing hole of the LCD panel; and
    a plurality of fixing elements, passing through the through holes of the housing, the through holes of the fixed plate, and the fixing holes of the LCD panel sequentially and respectively to fix the housing, the fixed plate and the LCD panel.

2. The thin LCD device of claim 1, further comprising two side fixing strips installed between the housing and the fixed plate, and the side fixing strips having a plurality of through holes, and each through hole being configured to be corresponsive to each respective through hole of the fixed plate, and each respective fixing hole of the LCD panel, wherein the fixing elements are passed through the through holes of the housing, the through holes of the fixing strips, the through holes of the fixed plate, and the fixing holes of the LCD panel sequentially and respectively to fix the housing, the side fixing strips, the fixed plate and the LCD panel.

3. The thin LCD device of claim 1, wherein the fixed plate is disposed close to the LCD panel.

4. The thin LCD device of claim 3, further comprising two side fixing strips installed between the housing and the fixed plate, and the side fixing strips having a plurality of through holes, and each through hole being configured to be corresponsive to each respective through hole of the fixed plate, and each respective fixing hole of the LCD panel, wherein the fixing elements are passed through the through holes of the housing, the through holes of the fixing strips, the through holes of the fixed plate, and the fixing holes of the LCD panel sequentially and respectively to fix the housing, the side fixing strips, the fixed plate and the LCD panel.

5. The thin LCD device of claim 3, wherein the housing is disposed close to the main board.

6. The thin LCD device of claim 5, further comprising two side fixing strips installed between the housing and the fixed plate, and the side fixing strips having a plurality of through holes, and each through hole being configured to be corresponsive to each respective through hole of the fixed plate, and each respective fixing hole of the LCD panel, wherein the fixing elements are passed through the through holes of the housing, the through holes of the fixing strips, the through holes of the fixed plate, and the fixing holes of the LCD panel sequentially and respectively to fix the housing, the side fixing strips, the fixed plate and the LCD panel.

7. The thin LCD device of claim 1, wherein the housing is disposed close to the main board.

8. The thin LCD device of claim 7, further comprising two side fixing strips installed between the housing and the fixed plate, and the side fixing strips having a plurality of through holes, and each through hole being configured to be corresponsive to each respective through hole of the fixed plate, and each respective fixing hole of the LCD panel, wherein the fixing elements are passed through the through holes of the housing, the through holes of the fixing strips, the through holes of the fixed plate, and the fixing holes of the LCD panel sequentially and respectively to fix the housing, the side fixing strips, the fixed plate and the LCD panel.

* * * * *